United States Patent [19]

Gardner

[11] Patent Number: 4,777,648
[45] Date of Patent: Oct. 11, 1988

[54] LINE TILT COMPENSATION METHOD AND APPARATUS

[75] Inventor: David L. Gardner, Pacific Palisades, Calif.

[73] Assignee: TRW Inc., Redondo Beach, Calif.

[21] Appl. No.: 941,680

[22] Filed: Dec. 15, 1986

[51] Int. Cl.$^4$ ............................................. H04K 1/02
[52] U.S. Cl. ......................................... 380/7; 380/14; 358/167
[58] Field of Search ................. 380/7, 14, 15; 358/167

[56] References Cited

U.S. PATENT DOCUMENTS

| | | | |
|---|---|---|---|
| 2,956,110 | 10/1960 | Shanahan | 380/7 |
| 4,295,223 | 10/1981 | Shutterly | 380/14 |
| 4,338,628 | 7/1982 | Payne et al. | 380/15 |
| 4,390,898 | 6/1983 | Bond et al. | 380/14 |
| 4,488,183 | 12/1984 | Kinjo | 380/7 |
| 4,562,465 | 12/1985 | Glaab | 380/15 |
| 4,639,777 | 1/1987 | Mori | 380/7 |
| 4,695,901 | 9/1987 | Ryan | 380/15 |

OTHER PUBLICATIONS

Baxes, Gregory A., "Digital Techniques Cure Line Segmentation Scrambling Problems," NCTA Technical Paper Presented at Las Vegas Convention, Jun. 2-5, 1985, pp. 308-313.
Bannai, Tatsushi et al., "Wideband Video Signal Recorder Having Level and Linearity Corrector," IEEE Technical Paper Presented at International Conference on Consumer Electronics, Jun. 6, 1986, pp. 248-249.

Primary Examiner—Salvatore Cangialosi
Attorney, Agent, or Firm—Noel F. Heal; Sol L. Goldstein

[57] ABSTRACT

An improved technique for removing line tilt and other types of line rate correlated noise interjected into the active portions of a video signal during transmission and reception of the video signal. The improved technique involves measuring the amplitude of the line rate correlated noise in a received video signal at points sampled across the active portions of a plurality of lines in the video signal. The video lines used for measurement are preferably constant-amplitude dummy video lines inserted into the video signal at the bottom of each video field prior to transmission of the video signal. A complementary line-rate-correlated noise waveform, based on the amplitude measurements, is then generated and summed with the active portions of the received video signal to remove the line rate correlated noise from the video signal.

26 Claims, 3 Drawing Sheets

FIG. 1A
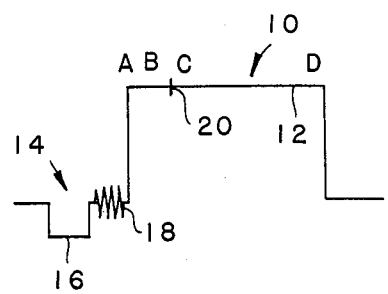
FIG. 1B
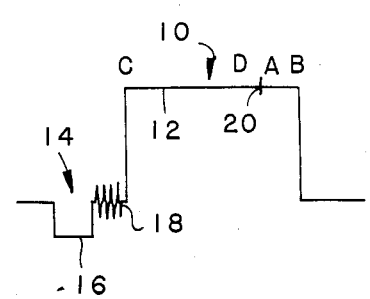
FIG. 1C
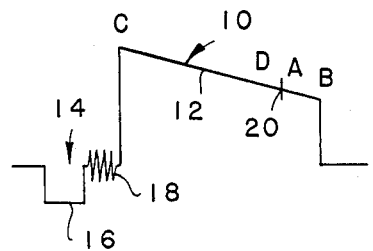
FIG. 1D
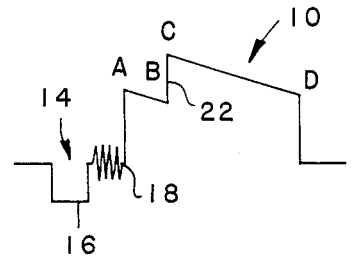
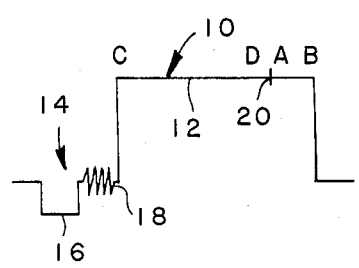
FIG. 1E
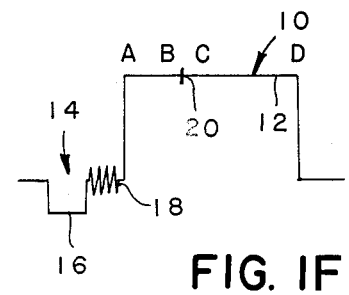
FIG. 1F

LINE TILT COMPENSATION METHOD AND APPARATUS

This application is related to an application entitled "Line Tilt Compensation Method and Apparatus," filed on Sept. 9, 1965, having Ser. No. 773,488, and assigned to the same assignee.

BACKGROUND OF THE INVENTION

This invention relates generally to television transmission and reception systems and, more particularly, to television transmission and reception systems utilizing compensation techniques that remove distortions interjected into a video signal during the transmission and reception process.

Secure transmission of video signals has become a matter of increasing importance with the growing popularity of video teleconferencing, cable TV and satellite TV transmissions, and with the introduction of direct-broadcast-satellite (DBS) transmission. Various encoding techniques have been developed that provide varying levels of security, with corresponding levels of complexity and cost. These range from relatively simple but easy to "break" sync-suppression techniques to relatively complex but difficult to "break" digital encryption techniques. One technique that provides a relatively secure video signal, with a modest amount of complexity and cost, is line spin scrambling.

Line spin scrambling is performed in an encoder by segmenting the active portion of each video line at a breakpoint determined by a pseudorandom number generator. The two segments of each video line are then interchanged, or "rotated," while the horizontal and vertical synchronization and blanking intervals are left intact. After transmission and reception of the video signal, the signal is unscrambled in a decoder by reversing the line spin scrambling applied to each video line in the encoder. The spin breakpoint of each scrambled video line is determined in the decoder by an identical pseudorandom number generator that is synchronized with the pseudorandom number generator in the encoder.

Although line spin scrambling offers many advantages, it has certain disadvantages. One of the disadvantages is that line tilt causes a distortion in the unscrambled video signal. Line tilt is generally a sawtooth-shaped voltage error that corrupts each video line during the transmission and reception process. The line tilt waveform is a linear charge ramp during the horizontal blanking interval and a linear discharge ramp during the active portion of the video line. Consequently, line tilt is correlated with the line rate of the video signal.

Line tilt corrupts the active portion of each video line whether the video line is scrambled with the line spin technique or not. However, the effect on a received picture is generally undetectable when a video signal has not been line-spin scrambled. This is because the amplitude and phase of the line tilt waveform are approximately the same for all video lines and, therefore, the effect across the received picture is constant in the vertical direction and is a gradual luminance variation in the horizontal direction. However, a video line that has been line-spin scrambled has the full amplitude of the line tilt applied at a single point, where the two segments are pieced back together during unscrambling. This causes a sharp luminance discontinuity at the randomly chosen spin breakpoint in each video line, resulting in a chaotic hashing of luminance striations in the received picture.

The above-referenced application discloses a line tilt compensation technique in which line tilt is removed from the active portions of a video signal by applying a linear complementary ramp, based on measurements of the amplitude of the line tilt, to the active portions of the video signal. Measurements of the line tilt amplitude are made by transmitting a constant-amplitude dummy video line at the bottom of each field of the video signal. At a receiver, the amplitude of the line tilt interjected into the active portion of each dummy video line during the transmission and reception process is measured by accumulating amplitude differentials between adjacent points sampled across the active portion of each dummy video line.

An NCTA technical paper entitled "Digital Techniques Cure Line Segmentation Scrambling Problems," by Gregory A. Baxes, presented at a Las Vegas Convention June 2-5, 1985, pp. 308-313, discloses a line tilt compensation technique in which the amplitude of the line tilt in each video line is measured by adding a reference level to the beginning and the end of the active portion of each video line prior to transmission. After transmission and reception, the amplitude differential between the two reference levels in each video line is measured and entered into a look-up table. The look-up table generates a linear complementary ramp that is summed with the active portion of the respective video line to remove the line tilt in that video line.

Both of these line tilt compensation techniques generate a simple complementary linear ramp. However, the line tilt waveform is frequently more complex than a simple linear ramp and, therefore, these techniques do not completely remove line tilt. Furthermore, both of these line tilt compensation techniques do not compensate for other types of line rate correlated noise, such as cross channel interference. Accordingly, there has been a need for an improved line tilt compensation technique. The present invention clearly fulfills this need.

SUMMARY OF THE INVENTION

The present invention resides in an improved line tilt compensation method and apparatus that removes line tilt and other types of line rate correlated noise interjected into the active portions of a video signal during transmission and reception of the video signal. Briefly, and in general terms, the invention involves measuring the amplitude of the line rate correlated noise in a received video signal at points sampled across the active portions of a plurality of lines in the video signal. A complementary line-rate-correlated noise waveform, based on the amplitude measurements, is then generated and summed with the active portions of the received video signal to remove the line rate correlated noise from the video signal.

More specifically, in a presently preferred embodiment of the invention, a multiplexer, located at a transmitter, inserts a constant-amplitude dummy video line into the video signal at the bottom of each video field prior to transmission of the video signal. A line tilt compensation circuit, located at a receiver, demultiplexes the dummy video lines from the received video signal and measures the amplitude of the active portion of each dummy video line at 256 points sampled across the video line. The dummy video line amplitude measurements are then filtered to remove non-line-rate-correlated, high frequency noise. This filtering is performed by averaging every four amplitude measurements in a dumping accumulator filter. Complemented amplitude measurements of the line rate correlated noise interjected into the dummy video lines during the transmission and reception process are made by subtracting the amplitude of each of the averaged amplitude measurements from the amplitude of the dummy video line prior to transmission.

The 64 complemented amplitude measurements from each dummy video line form a single complementary waveform element. The complementary waveform elements from many dummy video lines are filtered to remove non-line-rate-correlated, low frequency noise and to generate the complementary noise waveform. This filtering is performed by separately filtering each of the 64 complemented amplitude measurements over many video fields in a leaky accumulator waveform filter. After filtering, the 64-sample complementary noise waveform is scaled to reduce nonlinear amplitude dependencies of the line rate correlated noise. The scaled complementary noise waveform is then summed with the active portion of each video line to remove the line rate correlated noise from the video signal.

It will be appreciated from the foregoing that the present invention provides an improved line tilt compensation method and apparatus for removing line rate correlated noise from a video signal. Other features and advantages of the present invention will become apparent from the following more detailed description, taken in conjunction with the accompanying drawings, which illustrate, by way of example, the principles of the invention.

BRIEF DESCRIPTION OF THE DRAWINGS

FIGS. 1A–1F are voltage-time graphs of a video line before and after line spin scrambling and after transmission and reception, line tilt compensation, and line spin unscrambling;

DETAILED DESCRIPTION OF THE PREFERRED EMBODIMENTS

Figure 5:
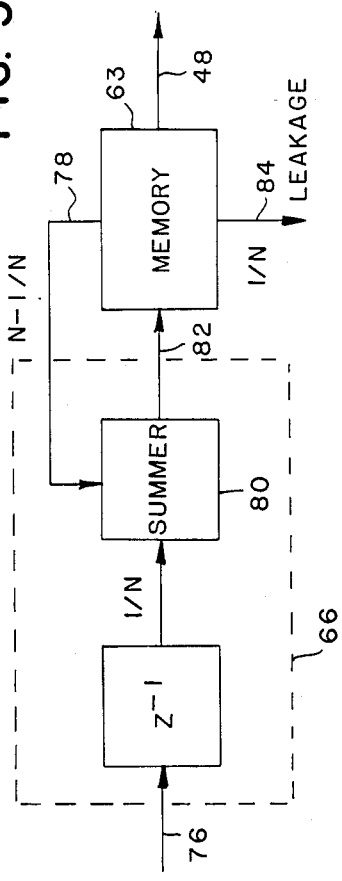
FIG. 5 is a detailed block diagram of the noise waveform filter.

As shown in the drawings for purposes of illustration, the present invention is embodied in an improved line tilt compensation method and apparatus that removes line tilt and other types of line rate correlated noise from the active portions of a video signal. Line spin scrambling provides a relatively secure video signal, with a modest amount of complexity and cost. However, line spin scrambling suffers from certain distortions that corrupt the unscrambled video signal. One of these distortions is caused by line tilt, which is generally a sawtooth-shaped voltage error that corrupts each line of the video signal during the transmission and reception process. This distortion appears in the received picture as a chaotic hashing of luminance striations. Several line tilt compensation techniques have been developed in the past, but none of these techniques completely removes line tilt. Furthermore, these line tilt compensation techniques do not compensate for other types of line rate correlated noise, such as cross channel interference.

In accordance with the present invention, line rate correlated noise is removed from the active portions of a received video signal by measuring the amplitude of the line rate correlated noise at points sampled across the active portions of a plurality of lines in the video signal. The video lines used for measurement are preferably constant-amplitude dummy video lines inserted into the video signal at the bottom of each video field prior to transmission of the video signal. A complementary line-rate-correlated noise waveform, based on the amplitude measurements, is then generated and summed with the active portions of the received video signal to remove the line rate correlated noise from the video signal.

FIGS. 1A through 1F illustrate the voltage-time graphs of a video line before and after line spin scrambling and after transmission and reception, line tilt compensation and line spin unscrambling. FIG. 1A illustrates a video line 10 having a constant-amplitude active portion 12. A horizontal blanking interval 14, which includes a horizontal synchronization signal 16 and an eight-cycle color burst 18, is also shown. FIG. 1B illustrates the video line 10 after line-spin scrambling about a pseudorandom spin breakpoint 20. The two segments AB and CD of the video line are interchanged, or "rotated," while the horizontal blanking interval 14 is left intact. During transmission and reception of the line-spin scrambled video line, the active portion of the scrambled video line is corrupted with line tilt, as shown in FIG. 1C. Line tilt is illustrated in FIG. 1C as a simple linear ramp for ease of illustration. If the corrupted video line is unscrambled without line tilt compensation, a video line having a luminance discontinuity 22 results, as shown in FIG. 1D. Because of the random nature of the discontinuity across the active portion of each video line, the result is a chaotic hashing of luminance striations in the received picture. However, if line tilt compensation is applied to the video line shown in FIG. 1D, a video line as shown in FIG. 1E results. After unscrambling, the original video line 10 is reproduced, as shown in FIG. 1F.

Figure 2:
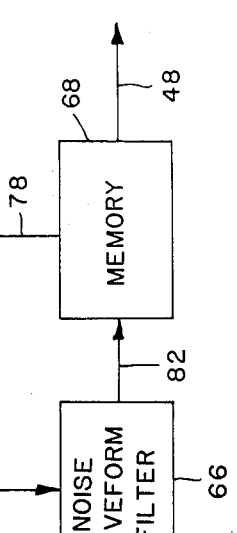
FIG. 2 is a block diagram of a multiplexer for inserting a dummy video line into a video signal.

FIG. 2 illustrates a multiplexer 30, located at a transmitter, for inserting a constantamplitude dummy video line into a video signal, on line 32, prior to transmission of the video signal. The dummy video line is generated by multiplexing a constant amplitude signal, on line 34, into the active portion of a designated video line, preferably at the bottom of each field of the video signal. A control signal, on line 36, controls the timing of the multiplexing operation. The multiplexed video signal containing the dummy video line is output by the multiplexer 30, on line 38. A typical dummy video line is illustrated by video line 10 in FIG. 1A.

Figure 3:
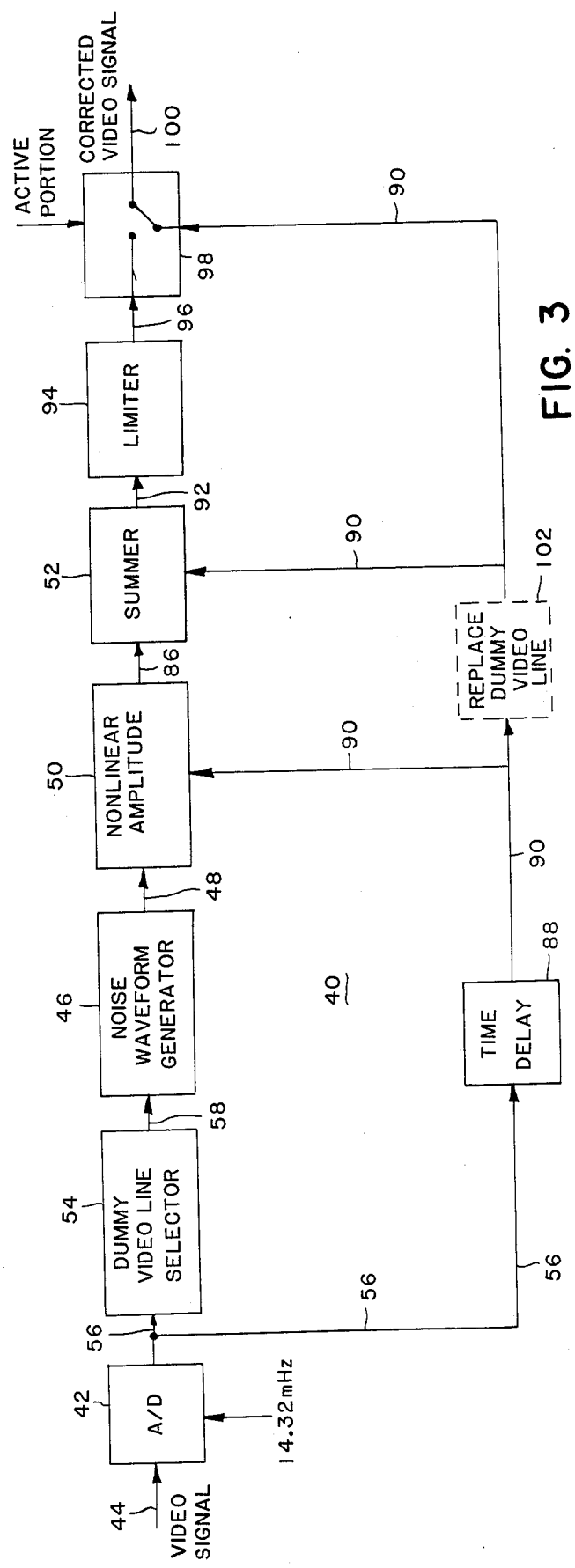
FIG. 3 is a block diagram of a line tilt compensation circuit, including a noise waveform generator.

FIG. 3 illustrates a line tilt compensation circuit 40, located at a receiver, for removing line rate correlated noise interjected into the video signal during the transmission and reception process. The line tilt compensation circuit 40 includes an analog-to-digital converter 42 for digitizing a received video signal, on line 44, a noise waveform generator 46 for generating a complementary linerate-correlated noise waveform, on line 48, a nonlinear amplitude scaling circuit 50 for scaling the complementary noise waveform to reduce nonlinear amplitude dependencies of the line rate correlated noise, and a summer 52 for adding the scaled complementary noise waveform to the active portions of the video signal to remove the line rate correlated noise from the video signal.

More specifically, the received video signal on line 44 is digitized by the analog-to-digital converter 42 at a sampling rate of 14.32 MHz with a quantization level of 12 bits. The 14.32 MHz sampling rate is four times the NTSC (National Television System Committee) color subcarrier frequency of 3.58 MHz. A dummy video line selector 54 demultiplexes the dummy video line from the digitized video signal, on line 56, and outputs the dummy video line, on line 58, for measurement of the amplitude of the line rate correlated noise and generation of the complementary line-rate-correlated noise waveform, both of which are performed by the noise waveform generator 46.

Figure 4:
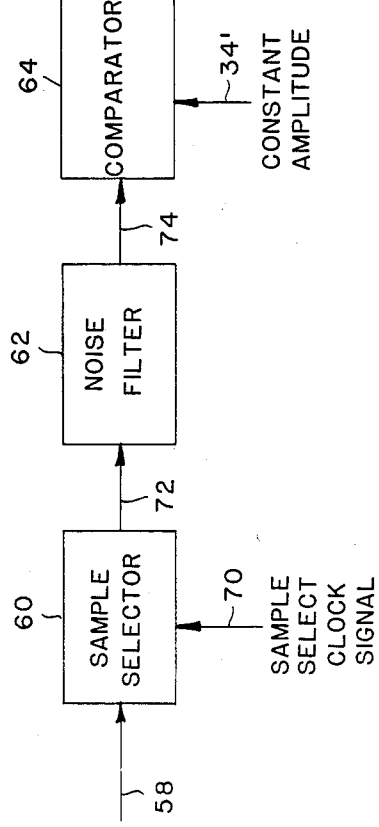
FIG. 4 is a detailed block diagram of the noise waveform generator, including a noise waveform filter.

The noise waveform generator 46, shown in greater detail in FIG. 4, includes, in series, a sample selector 60 for selecting samples of the active portion of the dummy video line for measurement, a noise filter 62 for filtering the selected samples to remove non-line-rate-correlated, high frequency noise, a comparator 64 for making complemented amplitude measurements, a noise waveform filter 66 for filtering the output of the comparator 64 to form the complementary line-rate-correlated noise waveform, and a memory 68 for storing the complementary line-rate-correlated noise waveform.

In the presently preferred embodiment of the invention, the sample selector 60 selects 256 samples of the active portion of each dummy video line for measurement of the amplitude of the line rate correlated noise. At a frequency of 14.32 MHz, 910 samples of digitized video (14.32 MHz/(60 fields/sec×262.5 lines/field)) are generated during each horizontal video line. Because approximately 165 of those samples are generated during the horizontal blanking interval, more than 700 samples of digitized video are available for selection. The 256 samples are preferably selected such that the highest density of selected samples occurs in the portions of the dummy video line having the highest frequency line rate correlated noise. This is generally near the end points of the active portion of the dummy video line. The 256 samples are selected by a sample select clock signal, on line 70, and output by the sample selector 60, on line 72.

The noise filter 62 removes non-line-ratecorrelated, high frequency noise from the stream of selected samples on line 72. Non-line-rate-correlated, high frequency noise is noise in the frequency range of the video chrominance signals. In the presently preferred embodiment of the invention, the noise filter 62 is a four-sample dumping accumulator filter. A four-sample dumping accumulator filter is a sampled finite impulse response filter having equally weighted coefficients for the four samples. The dumping accumulator filter accumulates four consecutive selected samples and averages the four samples. The output of the noise filter 62, on line 74, is a stream of 64 averaged samples per dummy video line.

The comparator 64 makes the complemented amplitude measurements by subtracting the amplitude of each of the averaged samples on line 74 from the amplitude of a constant amplitude signal, on line 34'. The constant amplitude signal on line 34' is the same amplitude signal that was used to form the dummy video line at the transmitter. In the presently preferred embodiment of the invention, the constant amplitude signal on lines 34, 34' is a 40 or 50 IRE unit (Institute of Radio Engineers) signal. Zero IRE units is full-scale black on the luminance scale and 100 IRE units is full-scale white on the luminance scale. The output of the comparator 64 is a stream of complemented amplitude measurements, on line 76. The 64 complemented amplitude measurements from each dummy video line form a single complementary waveform element.

The complementary waveform elements from many dummy video lines are filtered in the noise waveform filter 66 to remove non-line-rate-correlated, low frequency noise and to generate the complementary line-rate-correlated noise waveform on line 48. This filtering is performed by separately filtering each of the 64 complemented amplitude measurements output by the comparator 64 over many video fields. In the presently preferred embodiment of the invention, the noise waveform filter 66 is a leaky accumulator waveform filter having a leakage factor of 1/16 and a settling time of approximately three seconds. As illustrated in FIG. 5, the leaky accumulator waveform filter adds a new complemented amplitude measurement on line 76, weighted by a factor of $1/N$ ($N=16$), with an old average complemented amplitude measurement, on line 78, weighted by a factor of $N-1/N$ ($N=16$). The summation is performed at a summer 80 and the output, on line 82, is stored in the memory 68. The leakage from the memory 68, on line 84, is also weighted by a factor of $1/N$ ($N=16$), thus providing a very stable filter.

The memory 68 contains the 64-sample complementary noise waveform, which is then scaled by the nonlinear amplitude scaling circuit 50, illustrated in FIG. 3, to reduce the nonlinear amplitude dependencies of the line rate correlated noise. The change in amplitude of a video signal during the transmission and reception process varies depending on the amplitude of the video signal before transmission and whether a cable or satellite transmission system was used for the transmission. A cable transmission system generally uses clamping circuits that tend to reduce the amplitude of the video signal more at lower amplitudes than at higher amplitudes. The converse is generally true of a satellite transmission system. To compensate for these nonlinear amplitude dependencies, which affect the amplitude of the line rate correlated noise in each video line, the scaling circuit 50 of the presently preferred embodiment of the invention doubles the amplitude of the complementary noise waveform when a satellite transmission system is used and halves the amplitude of the complementary noise waveform when a cable transmission system is used. The nonlinear scaling of the complementary noise waveform is performed only for those video lines in which the first sample of the active portion of the video line is greater than 70 IRE units. If both types of transmission systems are used, then no scaling is performed, because the two nonlinear effects cancel each other.

In another presently preferred embodiment of the invention, the nonlinear amplitude dependencies are measured directly by varying the amplitude of the dummy video line from one video field to the next and measuring the amplitude differentials between the complementary noise waveforms generated from the different dummy video lines. Alternatively, several dummy video lines having different amplitudes are transmitted in the same video field. For example, three dummy video lines at 20, 50 and 80 IRE units are transmitted at the bottom of each video field. Measuring the amplitude differentials between the three complementary noise waveforms generated from the three dummy video lines provides a good measurement of the nonlinear amplitude dependencies.

The scaled complementary noise waveform, output by the nonlinear amplitude scaling circuit 50 on line 86, is then summed with the active portion of each video line to remove the line rate correlated noise from the video signal. prior to this summation at the summer 52, however, the digitized video signal on line 56 is delayed to allow time for the complementary noise waveform to be read from the memory 68 and scaled by the scaling circuit 50. The time delay is performed by a time delay circuit 88. The output of the time delay circuit 88 is a delayed, digitized video signal, on line 90. The corrected video signal, output by the summer 52 on line 92, is then limited by a limiter 94 to prevent overflow of the video signal caused by the addition of the scaled complementary noise waveform to the video signal. The output of the limiter 94, a limited, corrected video signal on line 96, is applied to a switch 98. During the active portions of the video signal, the switch 98 outputs the limited, corrected video signal on line 96 and during the non-active portions of the video signal, such as during the vertical blanking interval, the switch 98 outputs the video signal on line 90. The output of the switch 98 is a corrected video signal, on line 100.

The dummy video line can be removed from the delayed video signal on line 90 and replaced by a previous video line for display on a television screen by a replace dummy video line circuit 102. However, the replace circuit 102 is not necessary when the dummy video line is transmitted at the bottom of each video field, since a video line at the bottom of the video field is not visible on a television screen.

From the foregoing, it will be appreciated that the present invention provides an improved line tilt compensation method and apparatus for removing line rate correlated noise from a video signal. Although a preferred embodiment of the invention has been shown and described, it will be apparent that other adaptations and modifications can be made without departing from the spirit and scope of the invention. Accordingly, the invention is not to be limited, except as by the following claims.

I claim:

1. A method that removes line rate correlated noise interjected into the active portions of a video signal during transmission and reception of the video signal, comprising the steps of:
    measuring the amplitude of the line rate correlated noise in a received video signal at a plurality of points sampled across the active portions of each of a plurality of lines in the video signal;
    generating a complementary line-rate-correlated noise waveform based on the amplitude measurements; and
    summing the complementary noise waveform with the active portions of the received video signal.

2. The method as set forth in claim 1, wherein the step of measuring the amplitude includes the steps of:
    inserting a constant-amplitude dummy video line at the bottom of each video field prior to transmission of the video signal;
    demultiplexing the dummy video lines from the received video signal; and
    measuring the amplitude of the line rate correlated noise in the demultiplexed dummy video lines at points sampled across the active portions of the dummy video lines.

3. The method as set forth in claim 1, wherein the step of measuring the amplitude includes the steps of:
    inserting a constant-amplitude dummy video line at the bottom of each video field prior to transmission of the video signal;
    digitizing the received video signal;
    demultiplexing the digitized dummy video lines from the digitized video signal;
    selecting a plurality of the dummy video line samples; and
    subtracting the amplitude of each of the selected dummy video line samples from the amplitude of the dummy video line prior to transmission, thereby forming a stream of complemented amplitude measurements, wherein the complemented amplitude measurements from each dummy video line form a single complementary waveform element.

4. The method as set forth in claim 3, wherein the step of selecting further includes the step of:
    filtering the selected dummy video line samples to remove non-line-rate-correlated, high frequency noise.

5. The method as set forth in claim 4, wherein the step of filtering includes the steps of:
    accumulating a plurality of consecutive selected dummy video line samples; and
    averaging the accumulated dummy video line samples.

6. The method as set forth in claim 3, wherein the step of generating a complementary noise waveform includes the step of:
    filtering the complementary waveform elements over a plurality of video fields to remove non-line-rate-correlated, low frequency noise.

7. The method as set forth in claim 6, wherein the step of filtering includes the step of:
    filtering the waveform elements with a leaky accumulator waveform filter.

8. The method as set forth in claim 6, wherein the step of filtering includes the step of:
    separately filtering each of the complemented amplitude measurements over a plurality of video fields.

9. The method as set forth in claim 2, wherein the step of generating further includes the step of:
    scaling the complementary noise waveform to reduce nonlinear amplitude dependencies of the line rate correlated noise.

10. The method as set forth in claim 9, wherein the step of scaling includes the steps of:
    measuring the nonlinear amplitude dependencies of the line rate correlated noise; and
    scaling the complementary noise waveform based on the nonlinear amplitude measurements.

11. The method as set forth in claim 10, wherein the step of measuring the nonlinear amplitude dependencies includes the steps of:
    varying the amplitude of the dummy video line from one video field to the next; and
    measuring amplitude differentials between the complementary noise waveforms generated from the different dummy video lines.

12. The method as set forth in claim 10, wherein the step of measuring the nonlinear amplitude dependencies includes the steps of:
    inserting additional dummy video lines having varying amplitudes into each video field; and measuring amplitude differentials between the complementary noise waveforms generated from the different dummy video lines in each video field.

13. The method as set forth in claim 9, wherein the step of scaling includes the steps of:
doubling the amplitude of the complementary noise waveform when a satellite transmission system is used; and
halving the amplitude of the complementary noise waveform when a cable transmission system is used;
wherein the scaling is performed for those video lines in which the amplitude at the beginning of the active portion of the video line exceeds a selected value.

14. Apparatus for removing line rate correlated noise interjected into the active portions of a video signal during transmission and reception of the video signal, comprising:
means for measuring the amplitude of the line rate correlated noise in a received video signal at a plurality of sampled across the active portions each of a plurality of lines in the video signal;
means for generating a complementary linerate-correlated noise waveform based on the amplitude measurements; and
means for summing the complementary noise waveform with the active portions of the received video signal.

15. The apparatus as set forth in claim 14, wherein the means for measuring the amplitude includes:
means for demultiplexing constant-amplitude dummy video lines from the received video signal; and
means for measuring the amplitude of the line rate correlated noise in the demultiplexed dummy video lines at points sampled across the active portions of the dummy video lines.

16. The apparatus as set forth in claim 14, wherein the means for measuring the amplitude includes:
an analog-to-digital converter for digitizing the received video signal;
means for demultiplexing digitized constant-amplitude dummy video lines from the digitized video signal;
means for selecting a plurality of the dummy video line samples; and
means for subtracting the amplitude of each of the selected dummy video line samples from the amplitude of the dummy video line prior to transmission, thereby forming a stream of complemented amplitude measurements, wherein the complemented amplitude measurements from each dummy video line form a single complementary waveform element.

17. The apparatus as set forth in claim 16, wherein the means for selecting further includes:

a filter for filtering the selected dummy video line samples to remove non-line-rate-correlated, high frequency noise.

18. The apparatus as set forth in claim 17, wherein the filter includes:
a dumping accumulator filter.

19. The apparatus as set forth in claim 16, wherein the means for generating a complementary noise waveform includes:
a filter for filtering the complementary waveform elements over a plurality of video fields to remove non-line-rate-correlated, low frequency noise.

20. The apparatus as set forth in claim 9, wherein the filter includes:
a leaky accumulator waveform filter.

21. The apparatus as set forth in claim 19, wherein the filter includes:
means for separately filtering each of the complemented amplitude measurements over a plurality of video fields.

22. The apparatus as set forth in claim 15, wherein the means for generating further includes:
means for scaling the complementary noise waveform to reduce nonlinear amplitude dependencies of the line rate correlated noise.

23. The apparatus as set forth in claim 22, wherein the means for scaling includes:
means for measuring the nonlinear amplitude dependencies of the line rate correlated noise; and
means for scaling the complementary noise waveform based on the nonlinear amplitude measurements.

24. The apparatus as set forth in claim 23, wherein the means for measuring the nonlinear amplitude dependencies includes:
means for measuring amplitude differentials between complementary noise waveforms generated from dummy video lines transmitted with varying amplitudes from one video field to the next.

25. The apparatus as set forth in claim 23, wherein the means for measuring the nonlinear amplitude dependencies includes:
means for measuring amplitude differentials between complementary noise waveforms generated from dummy video lines transmitted with varying amplitudes in each video field.

26. The apparatus as set forth in claim 22, wherein the means for scaling includes:
means for doubling the amplitude of the complementary noise waveform when a satellite transmission system is used; and
means for halving the amplitude of the complementary noise waveform when a cable transmission system is used;
wherein the scaling is performed for those video lines in which the amplitude at the beginning of the active portion of the video line exceeds a selected value.

* * * * *